Patented Oct. 9, 1928.

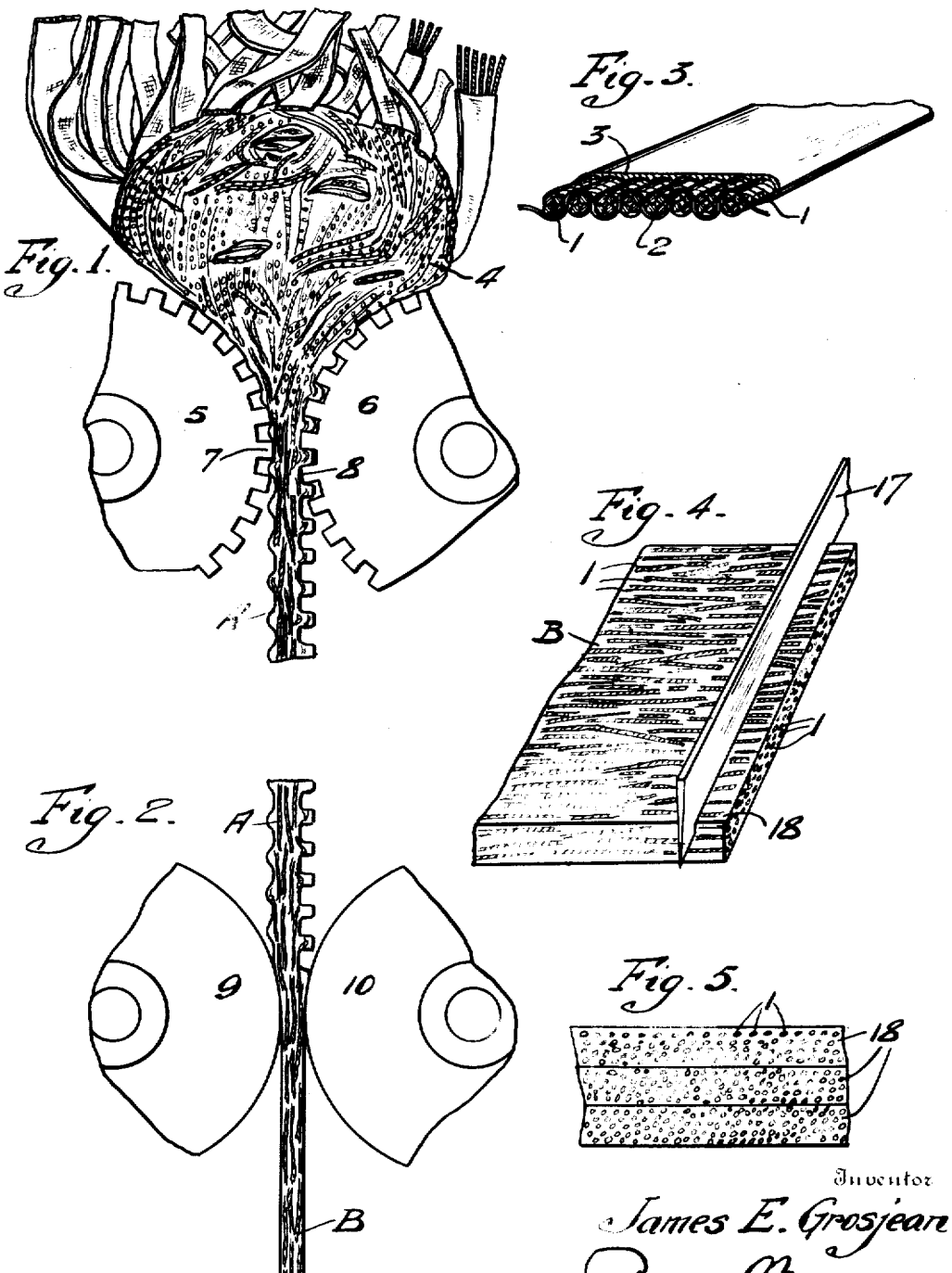

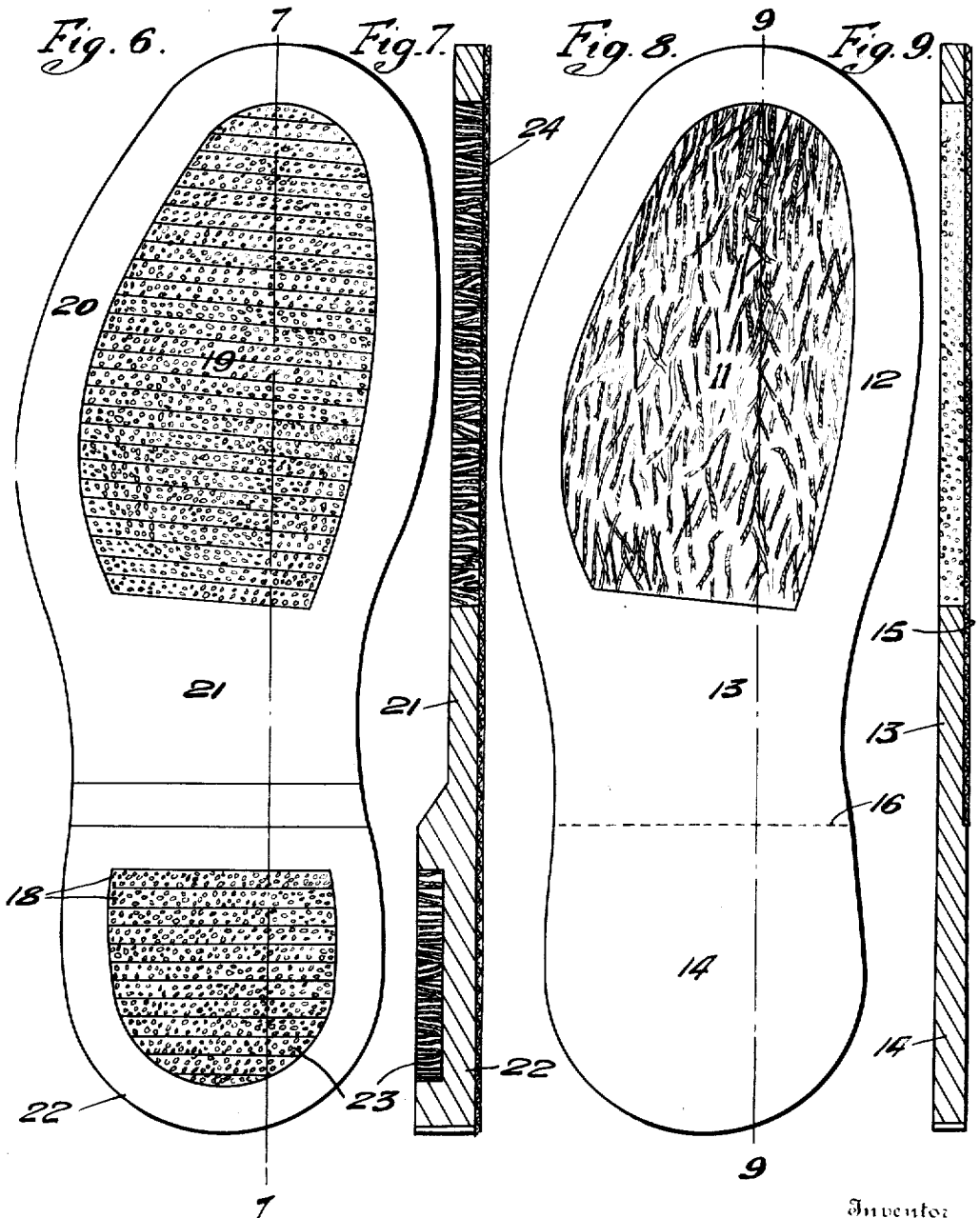

1,687,441

UNITED STATES PATENT OFFICE.

JAMES E. GROSJEAN, OF LIMA, OHIO.

TREAD MATERIAL AND METHOD OF MAKING THE SAME.

Application filed June 26, 1924. Serial No. 722,552.

The present invention relates to materials adapted for use in the making of wear and tread surfaces such as the soles or wear surfaces of boots and shoes, the present application being a continuation in part of my prior application, Serial No. 662,477, filed September 13, 1923, Patent No. 1,564,060, granted December 1, 1925.

The primary object of the invention is to provide a novel and improved material of the character referred to which may be manufactured or produced very inexpensively and which is very tough and possesses great wear-resisting properties, it utilizing the wear-resisting properties and toughness of textile or similar fibrous material.

Another object of the invention is to provide a method whereby such material may be produced from the trimmings or waste incident to the manufacture of cord and fabric tires for automobiles, such trimmings or waste usually consisting of scraps or remnants of strips of cord or fabric stock having the cords thereof impregnated with uncured "friction" or high grade rubber cement and the assembled cords covered by a thin coating of uncured rubber, such trimmings being usually discarded as refuse. The present invention enables masses of such trimmings or refuse having the cords extending promiscuously therein, to be treated in a manner which will re-arrange the cords so that most of them extend in the same direction in a sheet produced from such mass; and such sheet having the cords so arranged therein, after being cut, shaped or otherwise formed according to the tread surface or other article to be made therefrom, is cured, as the result of which the friction and rubber associated with the cords are vulcanized, thus strongly uniting the cords and producing a material which possesses great strength, toughness and wear-resisting properties.

A further object of the invention is to provide a sole for boots and shoes which is constructed from a material made in accordance with the present invention, such soles possessing great strength, toughness and wear-resisting properties and being capable of production at a very low cost.

In the accompanying drawings:—

Figure 1 is a diagrammatic view showing the preferred mode of treating the refuse cord stock to re-arrange the cords so that most of them extend in the same general direction;

Figure 2 is a diagrammatic view showing the preferred mode of producing a sheet of the improved material from the stock treated in the manner illustrated in Figure 1;

Figure 3 is a detail perspective view on an enlarged scale of a fragment of a scrap of cord stock such as is found in the trimmings or refuse resulting from the manufacture of cord automobile tires;

Figure 4 is a detail perspective view of a portion of a sheet of the improved material, this view indicating the manner in which the sheet may be cut in a direction crosswise of the general direction in which the cords extend in order to form strips:

Figure 5 is a fragmentary view showing a plurality of strips thus cut from a sheet assembled so that the ends of the cords are presented at the exposed face of the assembled structure;

Figure 6 is a view showing a sole for boots or shoes constructed from strips of material made in accordance with the present invention;

Figure 7 represents a section through the sole shown in Figure 6 on the line 7—7 thereof;

Figure 8 shows a sole for boots or shoes made up of material produced in accordance with the present invention without cutting the sheet of material into strips; and Figure 9 represents a section through the sole shown in Figure 8 on the line 9—9 thereof.

The present invention provides a novel and improved material, and a method of making the same, which are applicable generally to all situations where a tread or similar surface of great strength, toughness and wear-resisting properties is desired, the present invention enabling a material suitable for such purposes to be produced very inexpensively as it makes use of scraps or waste material which is usually discarded by tire factories as useless. The preferred mode of carrying out the invention will be hereinafter described in detail, with the aid of the accompanying drawings, but it is to be understood that the invention is not restricted to the precise embodiment of the invention set forth as other ways of carrying out the invention are contemplated and such will be included within the scope of the claims.

In carrying out the invention, use is made of the scraps or remnants of cord and fabric stock which is used by tire factories in the manufacture of cord and fabric automobile tires, it being well known in the art that a considerable waste of such stock results due to the trimming of the edges thereof after the stock has been laid upon the tire mold. These scraps or trimmings comprise strips or pieces of various sizes and shapes, but each strip or piece is composed of one or more plies of cords or threads 1 which are composed of textile or fibrous material, the cords of each ply in said stock, lying side by side or in substantial parallelism and held from relative displacement at intervals in their length by their small interwoven cross threads 2. The cords of both cord and fabric stock are usually impregnated to a high degree with so-called "friction" which is a high grade rubber cement in an uncured condition, and the body formed of the assembled cords is coated or covered with a skim coating of rubber designated 3 in Figure 3, this rubber coating being also in an uncured condition. Masses of scraps or trimmings of such waste stock are usually discarded as refuse by tire factories.

The present invention enables such waste material to be utilized in the production of the improved material. A mass 4 of such waste material which comprises scraps or strips of the cord and fabric stock which are stuck together by the tacky properties of the strips or scraps and in which the cords extend promiscuously is passed through a cracker such as those used in tire factories and which comprises a pair of oppositely mounted rolls 5 and 6 having axially extending ribs 7 and 8 on their peripheries. One of the ribbed rolls (for example, the roll 5, revolves at a higher surface speed than that of the other roll 6, as the result of which the ribs on the surface of the roll 5 produces a drawing or dragging action upon the material passing between the rolls while the material in contact with the slower moving roll 6 is pressed into and takes the shape of the tooth spaces of the roll 6. The effect of the action of the ribbed rolls moving at different surface speeds is to re-arrange the cords in the material so that they will extend mostly in the same direction; that is, longitudinally of the strip. After a mass of the waste material has been passed through the cracker, the distance between the cracker rolls 5 and 6 is reduced somewhat, and the sheet resulting from the first passage of the material between the rolls is again passed between these rolls, in consequence of which a further action is produced tending to arrange the cords or threads so that they extend longitudinally of the sheet; and the passage of the sheet through the cracker is repeated a sufficient number of times to bring the sheet to the desired thickness and to re-arrange the cords or threads so that most of them extend longitudinally of the sheet. The sheet of material after being treated by the cracker is then passed through a mill embodying opposed smooth-faced rolls 9 and 10, these rolls being spaced apart a distance substantially equal to the desired thickness of the finished sheet of material to be produced and one of these rolls, as for example, the roll 9 revolves at a somewhat higher peripheral speed, as was the case with the cracker rolls 5 and 6, and the effect of the passage of the strip through this mill is to arrange the cords so that they extend longitudinally of the sheet, supplementary to the action produced by the cracker rolls, and to roll out the sheet so that it will have a uniform thickness and will be smooth on both sides. A designates the sheet as it comes from the cracker and B designates the finished but unvulcanized sheet as it comes from the mill. Figure 4 illustrates a portion of the finished sheet B, this figure illustrating the cords or threads 1 as extending mostly in the same direction; that is, longitudinally of the sheet, the ends of these cords or threads being presented at the end of the sheet.

Sheets of the material B may be utilized to provide thread or wear surfaces of various kinds, either or both of the flat sides of the sheet serving as the thread or wear surface. For example, Figures 8 and 9 show a sole suitable for boots and shoes which comprises a portion 11 which is cut of the desired size and shape from a sheet of the material B in the form in which this sheet comes from the mill. The sole section 11 may, if desired, extend entirely to the edge of the sole, but, as shown in Figures 8 and 9, this sole section 11 is somewhat smaller than the shoe sole and it is surrounded by a margin 12 which may be composed of a rubber compound such as that commonly used in the manufacture of rubber soles, it joining the shank portion 13 and the heel portion 14 of the sole which may be composed of the same rubber compound. A sheet of canvas or other suitable woven textile material 15 impregnated with uncured friction and uncured rubber is preferably applied to the back of the sole and extends past the shank to the line 16. In making a sole of the kind just described, the sole section 11 composed of the waste cord material treated in accordance with the present invention and embodying the uncured friction and uncured rubber, the rubber compound to form the surrounding margin 12, the shank 13, and the heel portion 14, and the frictioned or uncured rubber impregnated backing 15, are assembled in the manner shown in Figures 8 and 9, and then placed in a mold of suitable size and shape wherein they are cured in the manner usual with ordinary rubber soles as the result of which the rubber and friction constituents of the different parts become vulcanized so that the elements of the sole are securely united or bonded together and acquire the characteristics of vulcanized rubber. A tread surface or sole section similar to the section 11 shown in Figures 8 and 9 when vulcanized, possesses much greater strength, toughness and wear-resisting properties than treads, wear surfaces or soles constructed of materials such as those heretofore used.

Increased wear resisting properties may be obtained by constructing the tread, sole or wear surface of a number of strips cut from a sheet of the material B and assembled so that the ends of the cords or threads are presented to the tread or wear surface. In such cases, the sheet B may be cut, as by a knife 17 (Fig. 3) to produce a number of strips 18, the sheet B being cut in a direction crosswise of its length or the length of the cords or threads therein. The strips cut in this way are then assembled as shown in Figure 5 so that their cut edges will form the front and back of the tread or sole in consequence of which the ends of the threads will be presented to the surfaces of the structure, either or both of which may be utilized as a wear surface. In constructing a sole of the strips 18, these strips cut from the sheet B and in an uncured condition are assembled in the manner shown in Figure 5 and the assembled structure is cut in the desired shape and size to form a sole section 19. This sole section may extend to the edges of the sole, but, as shown in Figure 6, it is made somewhat smaller than the sole and it is surrounded at the sides and forward end by a margin 20 which may be composed of uncured rubber compound such as that commonly used in the manufacture of rubber shoe soles. This margin 20 preferably joins a shank portion 21 of the sole which may be composed of the same uncured rubber compound, and the shank portion 21 may join a heel portion 22 which may also be composed of uncured rubber compound which is somewhat thicker than the sole and shank portions, and if desired, a tread portion 23 may be embedded in the heel portion, this tread portion of the heel being composed of strips 18 cut from a sheet B so that the ends of the cords or threads are presented to the tread or wear surface. A backing 24 composed of canvas or other woven material impregnated with friction or vulcanizable rubber is preferably applied to the back of the sole. The sole, after its elements have been assembled in the manner described and as shown in Figures 6 and 7, may be placed in a mold of a suitable size and shape and then cured in the manner usual with ordinary rubber soles, as the result of which the friction and rubber constituents of the sole are vulcanized so that the sole acquires the characteristics of vulcanized rubber.

Tread material made in accordance with the present invention can be produced, according to the present invention, at a very small cost, it enabling waste material which is usually discarded by tire factories as refuse, to be utilized. The material, moreover, possesses great strength, toughness and durability as it makes use of the great wear resisting properties of the cords or threads of textile material which are strewn through it. By arranging these cords or threads so that most of them extend in the same direction in the material, uniformity in the wear resisting properties of the material is attained, as the cords or threads are distributed uniformly through the material, and such arrangement of the cords or threads enables the material to be cut on lines cross-wise of the cords or threads to form strips, the cut edges of which have the ends of the cords or threads presented thereto. A sole or other tread or wear surface constructed from such strips, in the manner herein described, affords a surface of the greatest durability, owing to the endwise presentation of the cords or threads. Inasmuch as the "friction" impregnating the cords or threads and the rubber coating thereon are uncured or unvulcanized and remain so until after the material has been prepared and is shaped into the final form, the cords or threads on the finished articles will be firmly bonded together and moreover, the cords themselves will be more or less filled with the cured "friction" after vulcanization so that the cords or threads will be waterproof and hence not subject to swelling, disintegration of rotting, these properties of the improved material rendering it particularly suitable for use in the manufacture of shoe soles or other tread surface which are subject to the influences of the weather.

In using waste fabric stock resulting from the manufacture of so-called fabric tires, the action of the cracker rolls and the mill rolls in arranging the cords of the fabric so that most of these cords extend in the same direction in the sheet is substantially the same as that which takes place when the waste cord stock is used, the cracker and mill rolls moreover acting to pull apart, more or less, the interwoven cords composing the fabric.

In making soles for boots or shoes from material embodying the present invention, using a margin composed of rubber compound around the portion of the sole which comprises the said material, the margin will be cured to a greater degree than the cord-containing material, c /ing to the fact that the cord-containing material is impregnated with a high grade rubber friction which cures more slowly than does a rubber compound such as that usually employed in making rubber soles, and this is an advantage, as the portion of the sole composed of the cord-contained material and which is cured to a less degree will be made pliable, elastic and tougher than the surrounding margin composed of the rubber compound which is cured to a greater degree.

I claim as my invention:—

1. The method of making a tread surface which comprises subjecting a mass of uncured waste cord or fabric tire stock consisting wholly of uncured friction coated and impregnated cords extending promiscuously therein to a drawing action to rearrange the cords so that most of them are caused to extend in the same direction and to distribute the cords loosely and uniformly while maintaining the cords of substantial length, rolling the resulting product to form it into a smooth sided sheet having most of the cords extending longitudinally thereof, cutting such sheet transversely to form strips, assembling said strips side by side so that most of the cords therein extend in the same direction in all the strips and to form a tread wherein most of the cords are presented endwise to the tread surface, and vulcanizing the assembled strips to bond together elastically the friction coated and impregnated cords composing them and to unite the strips.

2. A sheet of material of the character described comprising a plurality of strips of material, each strip being composed wholly of waste cord or fabric tire stock and consisting of individual friction coated and impregnated cords of substantial length, the strips being laid side by side and vulcanized together to form the sheet, the cords being distributed uniformly and loosely in each strip so that most of them are presented endwise to a surface of the sheet, and the cords in each strip being bonded together elastically by vulcanization of the friction coating and impregnating them.

3. A tread for boots and shoes comprising strips each consisting wholly of individual unwoven textile friction coated and impregnated cords of substantial length distributed uniformly and loosely so that they extend mostly in the same direction in each strip, said strips extending across the tread and having the cords therein arranged to extend in a direction substantially normally to the wear surface of the tread and presenting their ends to such surface, the friction coating and impregnating the cords being vulcanized and thereby bonding together elastically the cords in each strip.

In testimony whereof I have hereunto set my hand.

JAMES E. GROSJEAN.

CERTIFICATE OF CORRECTION.

Patent No. 1,687,441.  Granted October 9, 1928, to

JAMES E. GROSJEAN.

It is hereby certified that error appears in the printed specification of the above numbered patent requiring correction as follows: Page 2, line 43, strike out the parenthisis character and insert a comma; same page, lines 98 and 100, for the word "thread" read tread; page 3, line 109, for "of" read or, and line 113, for "surface" read surfaces; page 4, line 8, for the compound word "cord-contained" read cord-containing; and that the said Letters Patent should be read with these corrections therein that the same may conform to the record of the case in the Patent Office.

Signed and sealed this 28th day of April, A. D. 1931.

(Seal)

M. J. Moore,
Acting Commissioner of Patents.

containing material, c /ing to the fact that the cord-containing r,aterial is impregnated with a high grade rubber friction which cures more slowly than does a rubber compound such as that usually employed in making rubber soles, and this is an advantage, as the portion of the sole composed of the cord-contained material and which is cured to a less degree will be made pliable, elastic and tougher than the surrounding margin composed of the rubber compound which is cured to a greater degree.

I claim as my invention:—

1. The method of making a tread surface which comprises subjecting a mass of uncured waste cord or fabric tire stock consisting wholly of uncured friction coated and impregnated cords extending promiscuously therein to a drawing action to rearrange the cords so that most of them are caused to extend in the same direction and to distribute the cords loosely and uniformly while maintaining the cords of substantial length, rolling the resulting product to form it into a smooth sided sheet having most of the cords extending longitudinally thereof, cutting such sheet transversely to form strips, assembling said strips side by side so that most of the cords therein extend in the same direction in all the strips and to form a tread wherein most of the cords are presented endwise to the tread surface, and vulcanizing the assembled strips to bond together elastically the friction coated and impregnated cords composing them and to unite the strips.

2. A sheet of material of the character described comprising a plurality of strips of material, each strip being composed wholly of waste cord or fabric tire stock and consisting of individual friction coated and impregnated cords of substantial length, the strips being laid side by side and vulcanized together to form the sheet, the cords being distributed uniformly and loosely in each strip so that most of them are presented endwise to a surface of the sheet, and the cords in each strip being bonded together elastically by vulcanization of the friction coating and impregnating them.

3. A tread for boots and shoes comprising strips each consisting wholly of individual unwoven textile friction coated and impregnated cords of substantial length distributed uniformly and loosely so that they extend mostly in the same direction in each strip, said strips extending across the tread and having the cords therein arranged to extend in a direction substantially normally to the wear surface of the tread and presenting their ends to such surface, the friction coating and impregnating the cords being vulcanized and thereby bonding together elastically the cords in each strip.

In testimony whereof I have hereunto set my hand.

JAMES E. GROSJEAN.

CERTIFICATE OF CORRECTION.

Patent No. 1,687,441.  Granted October 9, 1928, to

JAMES E. GROSJEAN.

It is hereby certified that error appears in the printed specification of the above numbered patent requiring correction as follows: Page 2, line 43, strike out the parenthisis character and insert a comma; same page, lines 98 and 100, for the word "thread" read tread; page 3, line 109, for "of" read or, and line 113, for "surface" read surfaces; page 4, line 8, for the compound word "cord-contained" read cord-containing; and that the said Letters Patent should be read with these corrections therein that the same may conform to the record of the case in the Patent Office.

Signed and sealed this 28th day of April, A. D. 1931.

(Seal)

M. J. Moore,
Acting Commissioner of Patents.